United States Patent
Karlsson

(10) Patent No.: US 8,294,680 B2
(45) Date of Patent: Oct. 23, 2012

(54) SYSTEM AND METHOD FOR TOUCH-BASED TEXT ENTRY

(75) Inventor: Sven-Olof Karlsson, Malmö (SE)

(73) Assignee: Sony Mobile Communications AB, Lund (SE)

( * ) Notice: Subject to any disclaimer, the term of this patent is extended or adjusted under 35 U.S.C. 154(b) by 634 days.

(21) Appl. No.: 12/412,413

(22) Filed: Mar. 27, 2009

(65) Prior Publication Data

US 2010/0245261 A1   Sep. 30, 2010

(51) Int. Cl.
*G06F 3/041* (2006.01)
(52) U.S. Cl. .......... 345/173; 715/256; 715/780
(58) Field of Classification Search .......... None
See application file for complete search history.

(56) References Cited

U.S. PATENT DOCUMENTS

| | | | |
|---|---|---|---|
| 5,943,043 A * | 8/1999 | Furuhata et al. | 345/173 |
| 6,539,240 B1 * | 3/2003 | Watanabe | 455/566 |
| 6,590,887 B1 * | 7/2003 | Lee | 370/342 |
| 7,116,976 B2 * | 10/2006 | Thomas et al. | 455/417 |
| 7,469,381 B2 * | 12/2008 | Ording | 715/702 |
| 7,479,949 B2 * | 1/2009 | Jobs et al. | 345/173 |
| 7,483,720 B2 * | 1/2009 | Yajima | 455/566 |
| 2005/0154992 A1 | 7/2005 | Chen et al. | |
| 2007/0152978 A1 * | 7/2007 | Kocienda et al. | 345/173 |
| 2008/0126387 A1 * | 5/2008 | Blinnikka | 707/102 |
| 2008/0134088 A1 * | 6/2008 | Tse et al. | 715/810 |
| 2009/0005011 A1 * | 1/2009 | Christie et al. | 455/412.2 |
| 2009/0013248 A1 * | 1/2009 | Hutchison et al. | 715/256 |
| 2009/0061915 A1 * | 3/2009 | Bong | 455/466 |
| 2009/0228842 A1 * | 9/2009 | Westerman et al. | 715/863 |

OTHER PUBLICATIONS

International Search Report and Written Opinion from corresponding International Application No. PCT/IB09/006850.
International Preliminary Report on Patentability from corresponding International Application No. PCT/IB09/006850.

* cited by examiner

*Primary Examiner* — Joseph Haley
*Assistant Examiner* — Ifedayo Iluyomade
(74) *Attorney, Agent, or Firm* — Renner, Otto, Boisselle & Sklar, LLP

(57) ABSTRACT

An electronic device includes a touch screen that displays a message log containing text of one or more messages that have been transmitted by the electronic device or received by the electronic device, and that displays an input field to show text for a new message undergoing composition. The electronic also includes a control circuit that is configured to receive touch input signals from the touch screen that are indicative of user touch selection of text from the message log, and without additional user input, enter the touch selected text into the input field.

20 Claims, 4 Drawing Sheets

SYSTEM AND METHOD FOR TOUCH-BASED TEXT ENTRY

TECHNICAL FIELD OF THE INVENTION

The technology of the present disclosure relates generally to user interfaces for electronic devices and, more particularly, to an electronic device that includes touch-based text entry that allows a user to select text from a message log for populating a message undergoing composition.

BACKGROUND

Some portable electronic devices, such as mobile telephones, include touch screen technology to receive user input. For example, the touch screen may be used to receive user input to perform functions such as navigating menus, entering characters when the user touches corresponding displayed letters, numbers or symbols, and selecting links or displayed buttons. But there is exists room for improvement in the manner in which a touch screen may be used to facilitate and expedite text entry.

SUMMARY

To improve the entry of text during message composition, the present disclosure describes a system and method for touch-based text entry. Various touch commands may be used to select one or more words from a message log. When the message log is a record of conversational-style messages (e.g., a string of text messages, instant messages, or electronic messages), the message log may be referred to as a conversation log. In one embodiment, the user may touch text in the message log and the touched text instantly appears in an input field for a message undergoing composition. Thus, the touching of the text automatically results in addition of the corresponding text to the input field. Various types of touches may be used to select individual words or different word combinations, as will be described in greater detail in the following sections of this document.

According to one aspect of the disclosure, an electronic device includes a touch screen that displays a message log containing text of one or more messages that have been transmitted by the electronic device or received by the electronic device, and that displays an input field to show text for a new message undergoing composition; and a control circuit. The control circuit is configured to receive touch input signals from the touch screen that are indicative of user touch selection of text from the message log; and without additional user input, enter the touch selected text into the input field.

According to one embodiment of the electronic device, the touch input signal corresponds to user touching an individual word and the individual word is entered into the input field.

According to one embodiment of the electronic device, the touch input signal corresponds to a designated spot associated with a message from the message log and all text from the corresponding message is entered into the input field.

According to one embodiment of the electronic device, the touch input signal corresponds to user touching of a space between two words and the two words are entered into the input field.

According to one embodiment of the electronic device, the touch input signal corresponds to user touching of a first word and movement to touch a second word without interruption of the touching and the first and second words are entered into the input field in the order of touching.

According to one embodiment of the electronic device, the touch input signal corresponds to simultaneous touching of a first location and a second location to indicate a text selection starting location and a text selection ending location and text spanning from the starting location to the ending location is entered into the input field.

According to one embodiment of the electronic device, the control circuit is further configured to receive user input in the form of at least one of a key depression, handwriting on the touch screen or touching of a character from a displayed keyboard; and enter text corresponding to the user input into the input field with the touch selected text.

According to one embodiment of the electronic device, the control circuit is further configured to add touch selected text to a predictive text lexicon associated with the user.

According to one embodiment of the electronic device, the control circuit is further configured to display one or more suggested phrases on the touch screen; receive touch input signals from the touch screen that are indicative of user touch selection of text from one of the suggested phrases; and without additional user input, enter the touch selected text from the suggested phrases into the input field.

According to one embodiment of the electronic device, the electronic device is a mobile telephone.

According to another aspect of the disclosure, a method of entering text in an electronic device includes displaying a message log containing text of one or more messages that have been transmitted by the electronic device or received by the electronic device on a touch screen; displaying an input field to show text for a new message undergoing composition on the touch screen; receiving touch input via the touch screen that is indicative of user touch selection of text from the message log; and without additional user input, entering the touch selected text into the input field.

According to one embodiment of the method, the touch selection of text corresponds to user touching an individual word and the individual word is entered into the input field.

According to one embodiment of the method, the touch selection of text corresponds to a designated spot associated with a message from the message log and all text from the corresponding message is entered into the input field.

According to one embodiment of the method, the touch selection of text corresponds to user touching of a space between two words and the two words are entered into the input field.

According to one embodiment of the method, the touch selection of text corresponds to user touching of a first word and movement to touch a second word without interruption of the touching and the first and second words are entered into the input field in the order of touching.

According to one embodiment of the method, the touch selection of text corresponds to simultaneous touching of a first location and a second location to indicate a text selection starting location and a text selection ending location and text spanning from the starting location to the ending location is entered into the input field.

According to one embodiment, the method further includes receiving user input in the form of at least one of a key depression, handwriting on the touch screen or touching of a character from a displayed keyboard; and entering text corresponding to the user input into the input field with the touch selected text.

According to one embodiment, the method further includes adding touch selected text to a predictive text lexicon associated with the user.

According to one embodiment, the method further includes displaying one or more suggested phrases on the touch screen; receiving touch input via the touch screen that is indicative of user touch selection of text from one of the suggested phrases; and without additional user input, entering the touch selected text from the suggested phrases into the input field.

According to one embodiment of the method, the electronic device is a mobile telephone.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
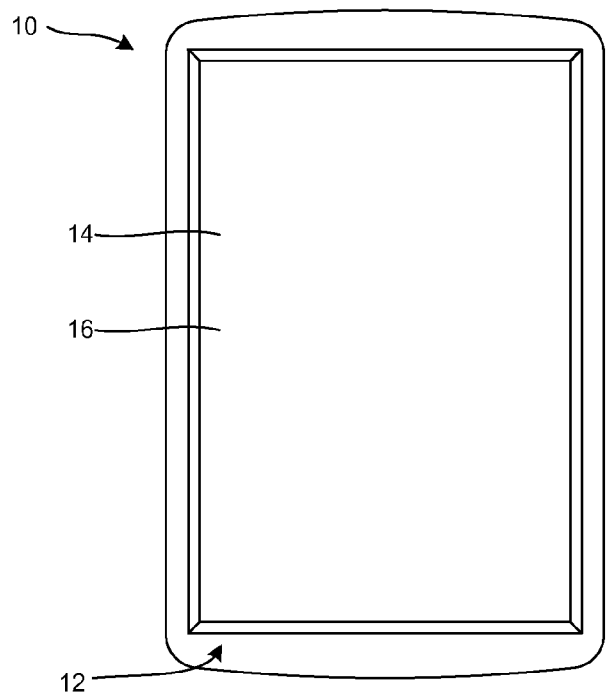
FIG. 1 is a schematic view of a mobile telephone as an exemplary electronic device that includes a touch screen input assembly.

Embodiments will now be described with reference to the drawings, wherein like reference numerals are used to refer to like elements throughout. It will be understood that the figures are not necessarily to scale.

In the present document, embodiments are described primarily in the context of a portable radio communications device, such as the illustrated mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a smartphone, a portable communication apparatus, etc.

Figure 2:
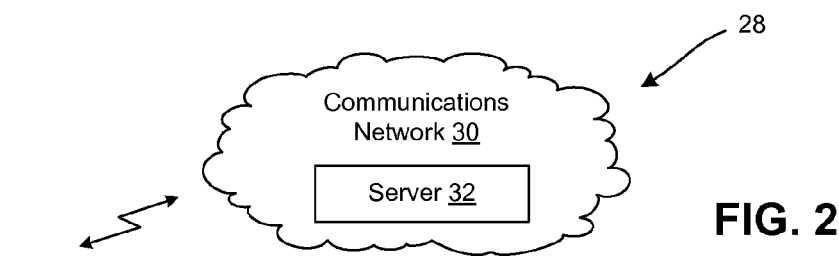
FIG. 2 is a schematic block diagram of the electronic device of FIG. 1 while operating as part of a communications system.
Figure 2:
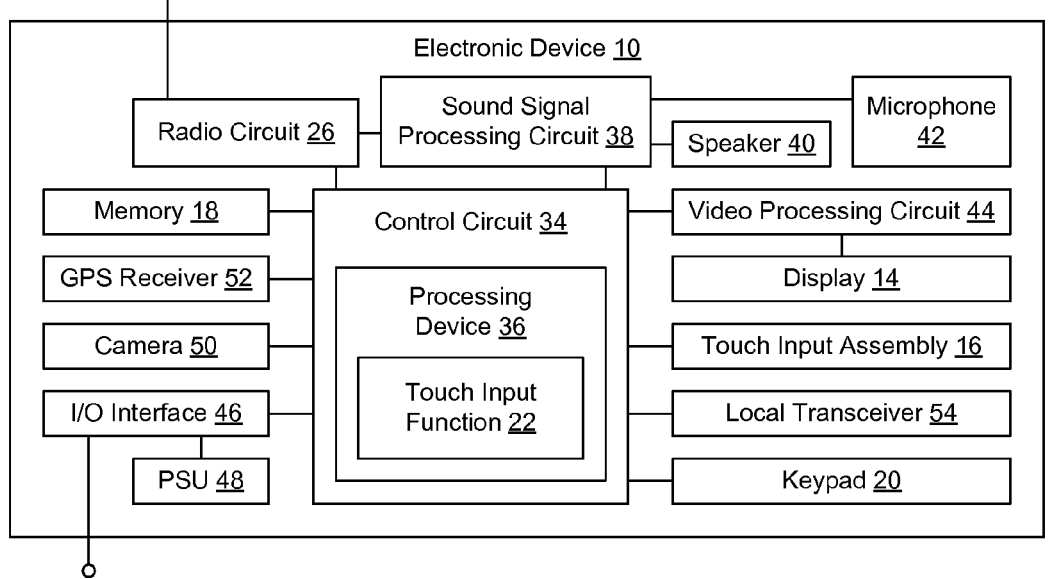

Referring initially to FIGS. 1 and 2, an electronic device 10 is shown. The electronic device 10 includes a touch screen 12. The touch screen 12 may include a display 14 and a touch input assembly 16 located over the display 14. The display 14 displays information to a user such as operating state, time, telephone numbers, contact information, various menus, etc., that enable the user to utilize the various features of the electronic device 10. The display 14 also may be used to visually display content received by the electronic device 10 and/or retrieved from a memory 18 (FIG. 2) of the electronic device 10. The display 14 may be used to present images, video and other graphics to the user such as, but not limited to, photographs, mobile television content, Internet pages, and video associated with games. The touch input assembly 16 may be, for example, a resistive touch input assembly or a capacitive touch input assembly, and may include any appropriate interface circuitry (e.g., a general purpose input/output or GIPO) to analyze raw signals from a sensor component and generate input signals or commands corresponding to sensed user input.

As indicated, the display 14 and touch input assembly 16 may be used in conjunction with one another to implement touch screen functionality. For instance, the display 14 may display content to the user in the form of menus, representations of alphanumeric keys, links, and so forth. The user may touch (e.g., tap) the touch input assembly 16 to select a desired item of displayed content. Still other touch motions (e.g., touching and dragging a finger) may be used for other input purposes, such as writing, navigation, scrolling, moving a displayed item, etc.

The exemplary illustration of FIG. 1 shows the display 14 and touch input assembly 16 as being bezel-set into a housing of the electronic device 10. It will be appreciated that the display 14 and touch input assembly 16 may be retained without a bezel so as to be substantially flush with the housing of the electronic device 10.

In one embodiment, the electronic device 10 does not have any user input buttons or keys for text or navigation input. For instance, it may be possible that the only button present on the electronic device is an on/off power button. In other embodiments, a keypad 20 (FIG. 2) having alphanumeric keys, special character keys, and/or function keys may be located adjacent the touch screen 12. Alternatively, the keypad 20 may be accessed by sliding, pivoting or turning a housing portion of the electronic device 10 to expose the keypad 20 that is retained by another portion of the electronic device 10. However, this type of keypad 20 may be covered when the electronic device 10 is not opened in this manner. Therefore, the form factor and/or use arrangement (e.g., open or closed configuration) may be such that the electronic device 10, at any time or at some times, has no keys or buttons that may be used for user input.

The electronic device 10 may include a touch input function 22 that is configured to interpret user input from the touch input assembly 16 and take appropriate responsive action as part of a user interface (UI) of the electronic device 10. Additional details and operation of the touch input function 22 will be described in greater detail below. The touch input function 22 may be embodied as executable instructions (e.g., code) that is resident in and executed by the electronic device 10. In one embodiment, the touch input function 22 may be one or more programs that are stored on a computer readable medium. The touch input function 22 may be a stand-alone software application or form a part of a software application that carries out additional tasks related to the electronic device 10.

Also, through the following description, exemplary techniques for touch-based text entry are described. It will be appreciated that through the description of the exemplary techniques, a description of steps that may be carried out in part by executing software is described. The described steps are the foundation from which a programmer of ordinary skill in the art may write code to implement the described functionality. As such, a computer program listing is omitted for the sake of brevity. However, the described steps may be considered a method that the corresponding device is configured to carry out.

The electronic device 10 includes communications circuitry that enables the electronic device 10 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 18, executing applications to allow user interaction with the data, displaying video and/or image content associated with the data, outputting audio sounds associated with the data, and so forth.

In the exemplary embodiment, the communications circuitry may include an antenna 24 coupled to a radio circuit 26. The radio circuit 26 includes a radio frequency transmitter and receiver for transmitting and receiving signals via the antenna 24. The radio circuit 26 may be configured to operate in a mobile communications system 28. Possible radio circuit 26 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 24 and the radio circuit 26 may represent one or more than one radio transceiver.

The system 28 may include a communications network 30 having a server 32 (or servers) for managing calls placed by and destined to the electronic device 10, transmitting data to and receiving data from the electronic device 10 and carrying out any other support functions. The server 32 communicates with the electronic device 10 via a transmission medium. The transmission medium may be any appropriate device or assembly, including, for example, a communications base station (e.g., a cellular service tower, or "cell" tower), a wireless access point, a satellite, etc. The network 30 may support the communications activity of multiple electronic devices 10 and other types of end user devices. As will be appreciated, the server 32 may be configured as a typical computer system used to carry out server functions and may include a processor configured to execute software containing logical instructions that embody the functions of the server 32 and a memory to store such software. In alternative arrangements, the electronic device 10 may wirelessly communicate directly with another electronic device 10 (e.g., another mobile telephone or a computer) through a local network or without an intervening network.

The electronic device 10 may include a primary control circuit 34 that is configured to carry out overall control of the functions and operations of the electronic device 10. The control circuit 34 may include a processing device 36, such as a central processing unit (CPU), microcontroller or microprocessor. The processing device 36 executes code stored in a memory (not shown) within the control circuit 34 and/or in a separate memory, such as the memory 18, in order to carry out operation of the electronic device 10. For instance, the memory 18 within the control circuit 34 and/or the memory 18 may store executable code that embodies the touch input function 22 and the processing device 36 may execute that code so that the control circuit 34 is configured to implement the functions of the touch input function 22. In this regard, the control circuit 34 may receive user input commands from the touch input assembly 16. The input commands may be interpreted by the touch input function 22 and, in response, appropriate corresponding actions may be undertaken by the electronic 10. For example, various text entry actions will be described in greater detail in following portions of this document.

The memory 18 may be, for example, one or more of a buffer, a flash memory, a hard drive, a removable media, a volatile memory, a non-volatile memory, a random access memory (RAM), or other suitable device. In a typical arrangement, the memory 18 may include a non-volatile memory for long term data storage and a volatile memory that functions as system memory for the control circuit 34. The memory 18 may exchange data with the control circuit 34 over a data bus. Accompanying control lines and an address bus between the memory 18 and the control circuit 34 also may be present.

The electronic device 10 further includes a sound signal processing circuit 38 for processing audio signals transmitted by and received from the radio circuit 26. Coupled to the sound processing circuit 38 are a speaker 40 and a microphone 42 that enable a user to listen and speak via the electronic device 10. The radio circuit 26 and sound processing circuit 38 are each coupled to the control circuit 34 so as to carry out overall operation. Audio data may be passed from the control circuit 34 to the sound signal processing circuit 38 for playback to the user. The audio data may include, for example, audio data from an audio file stored by the memory 18 and retrieved by the control circuit 34, or received audio data such as in the form of voice communications or streaming audio data from a mobile radio service. The sound processing circuit 38 may include any appropriate buffers, decoders, amplifiers and so forth.

The display 14 may be coupled to the control circuit 34 by a video processing circuit 44 that converts video data to a video signal used to drive the display 18. The video processing circuit 44 may include any appropriate buffers, decoders, video data processors and so forth. The video data may be generated by the control circuit 34, retrieved from a video file that is stored in the memory 18, derived from an incoming video data stream that is received by the radio circuit 26 or obtained by any other suitable method.

The electronic device 10 may further include one or more input/output (I/O) interface(s) 46. The I/O interface(s) 46 may be in the form of typical mobile telephone I/O interfaces and may include one or more electrical connectors. The I/O interfaces 46 may form one or more data ports for connecting the electronic device 10 to another device (e.g., a computer) or an accessory (e.g., a personal handsfree (PHF) device) via a cable. Further, operating power may be received over the I/O interface(s) 46 and power to charge a battery of a power supply unit (PSU) 48 within the electronic device 10 may be received over the I/O interface(s) 46. The PSU 48 may supply power to operate the electronic device 10 in the absence of an external power source.

The electronic device 10 also may include various other components. For instance, a camera 50 may be present for taking digital pictures and/or movies. Image and/or video files corresponding to the pictures and/or movies may be stored in the memory 18. A position data receiver 52, such as a global positioning system (GPS) receiver, may be involved in determining the location of the electronic device 10. A local transceiver 54, such as an infrared transceiver and/or an RF transceiver (e.g., a Bluetooth chipset) may be used to establish communication with a nearby device, such as an accessory (e.g., a PHF device), another mobile radio terminal, a computer or another device.

Figure 3:
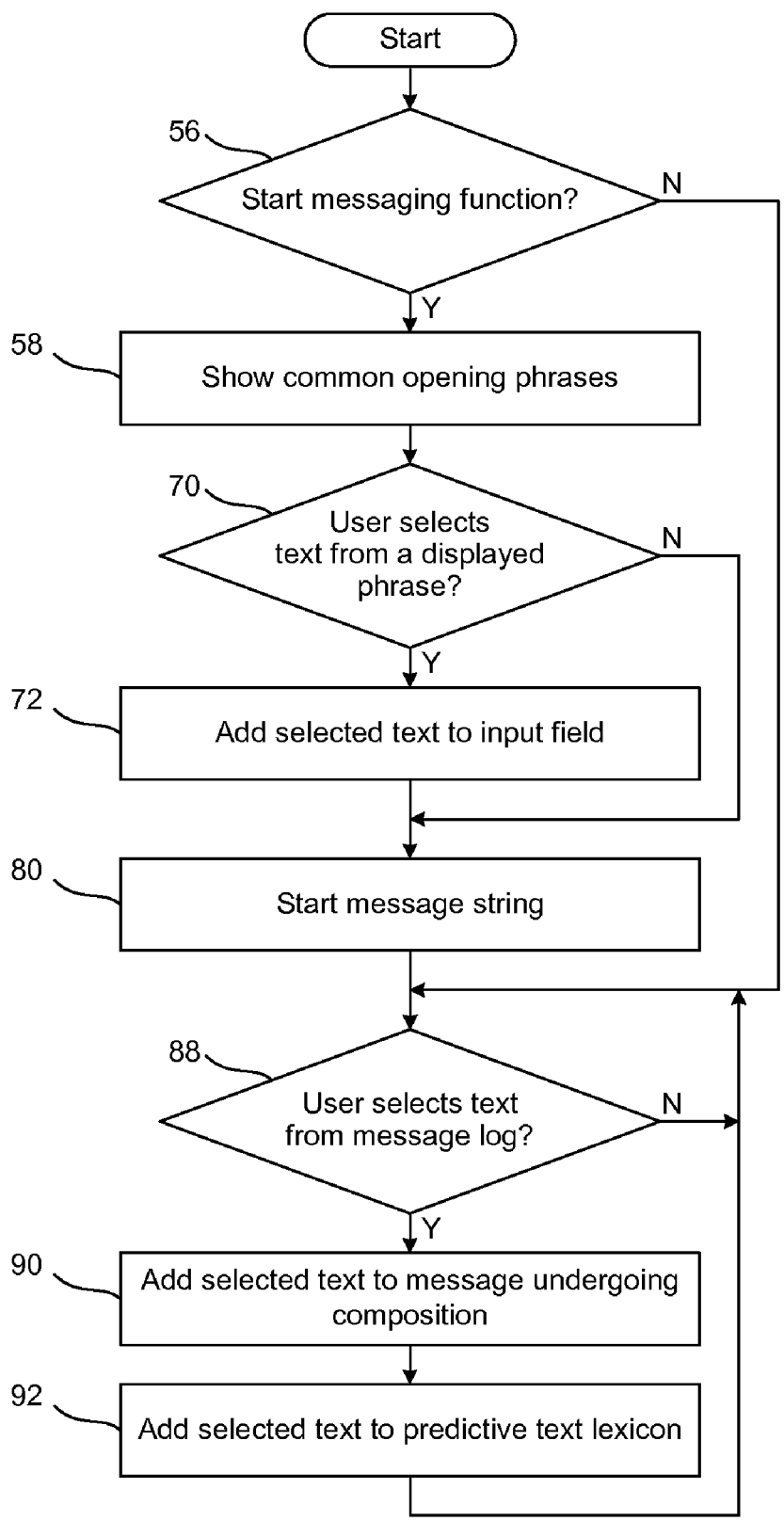
FIG. 3 is a flow chart representing an exemplary method of touch-based text entry using the mobile telephone of FIG. 1.

With additional reference to FIG. 3, illustrated are logical operations to implement an exemplary method of touch-based text entry. The exemplary method may be carried out by executing an embodiment of the touch input function 22, for example. Thus, the flow chart of FIG. 3 may be thought of as depicting steps of a method carried out by the electronic device 10. Although FIG. 3 shows a specific order of executing functional logic blocks, the order of executing the blocks may be changed relative to the order shown. Also, two or more blocks shown in succession may be executed concurrently or with partial concurrence. Certain blocks also may be omitted.

The logical flow of FIG. 3 describes the exemplary context of composing text while engaged in a conversational style flow of messages using text messages, instant messages, multimedia messages, or electronic mail messages. A conversational flow of messages typically arises when a user sends another person a message, who then responses. Additional messages may be transmitted back and forth so that the involved persons carry out an interactive exchange, or message-based conversation. Each message may be maintained in a message log that may be displayed on the display 14.

In addition to this exemplary context of operation, it will be understood that aspects of the described touch-based text input to automatically enter selected text from displayed text into an input field may be applied to other contexts, such as composing any type of message, composing in a word processor, entering a search string into an Internet browser, and so forth. Therefore, the illustrated and described representative context of conversational messaging is exemplary and is not intended to limit the application of the described techniques.

The logical flow may begin in block 56 where a determination is made as to whether the user starts a messaging function. For example, a positive determination may be made in block 56 if the user launches a message application using the electronic device 10. Even if the messaging function already has been launched, a positive determination also may be reached in block 56 is the user starts a new message to a new recipient.

If a positive determination is made in block 56, the logical flow may proceed to block 58. In block 58, a list of common phrases used to start a message string may be displayed. The list of common phrases may be user independent and derived from a lexicon of words and phrases that commonly appear in messages of this nature. Alternatively, the list of phrases may be user specific and derived from a lexicon of words and phrases that the user commonly uses in messages of this nature.

Figure 4:
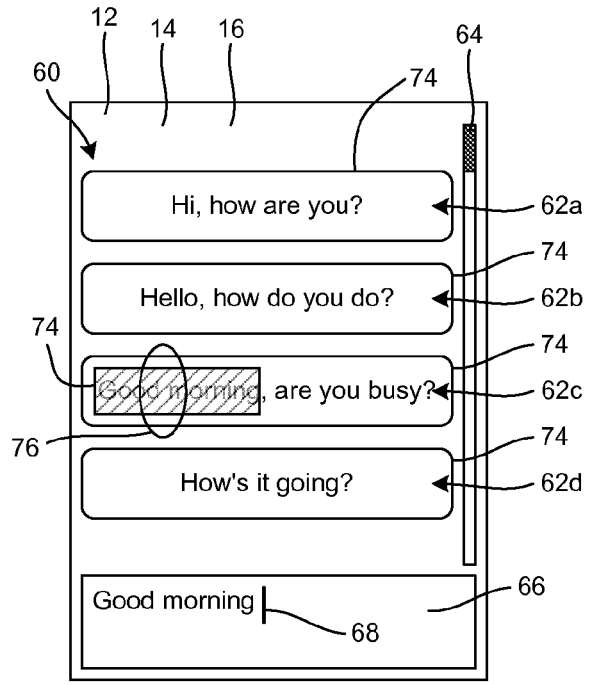
FIGS. 4 through 10 are schematic views of the touch screen of the mobile telephone of FIG. 1 representing various techniques for entering text by user touching of the touch screen.

With additional reference to FIG. 4, the touch screen 12 is shown with a displayed list 60 of possible opening phrases 62. In the illustrated example, four phrases 62a through 62d are shown, but it will be appreciated that less than or more than four phrases 62 may be shown. Each phrase may include one or more words. As used herein, the term word includes complete words with proper spelling, acronyms, and phonetic versions of a word or words that appear without an intervening space, as is a common way to write in text messages. Additional phrases 62 may be present in the list 60, which are accessible using a scroll bar 64 or other navigation tool.

Also shown is a text entry field, also referred to as an input field 66. The user may enter text (e.g., letters, numbers, symbols and other characters) in the input field by depressing buttons of the keypad 20 (if present), by pressing the touch input 16 over characters that are displayed on the display 14, drawing characters on the touch screen 12 that are interpreted as entered text, and by copying and pasting text from a text source. Copying and pasting text may include highlighting the text in the text source, selecting a copy command, returning to the input field 66, and selecting a paste command. The input field 66 may include a cursor 68 that indicates where new text will appear upon use of a text input technique.

Following block 58, the logical flow may proceed to block 70 where a determination is made as to whether the user selects text from one of the displayed phrases 62 to automatically enter the selected text into the input field 66. If a positive determination is made in block 70, the logical flow may proceed to block 72 where the selected text is automatically added to the input field 66. For purposes of this document, the automatic addition of text into the input field 66 involves adding the selected text without any additional user action (e.g., entering of commands) other than to select the text. Therefore, once selected, the text appears in the input field 66 at the current position of the cursor 68 without any intervening user actions, such as manual copying and pasting of the text.

A variety of text selection techniques for this purpose will be described in following paragraphs. In these examples, text that the user desires to appear in the input field 66 (or desired text 74) is highlighted using cross-hatching. The actual highlighting of text on the display 14 may not occur as part of the touch-based text entry. Also, in these examples, the general position of a user touch with one or more finger tips is shown with ovals 76. It will be understood that touch-based input may be invoked in other manners, such as touching with a knuckle, touching with a stylus, etc. Also, some touch input assemblies 16 may be sensitive to the nearly presence of a user finger or a stylus so that actual touching of the touch screen 12 is not required.

One exemplary text selection technique is illustrated in FIG. 4. In this technique, two words are selected by the user touching the touch screen 12 in the space between the desired words. In the illustrated example, the desired words are "good morning" from phrase 62c, which have been highlighted using cross-hatching to indicate the desired text 74. The result of touching in the space between the desired words is to automatically enter the corresponding words into the input field 66, as illustrated.

Figure 5:
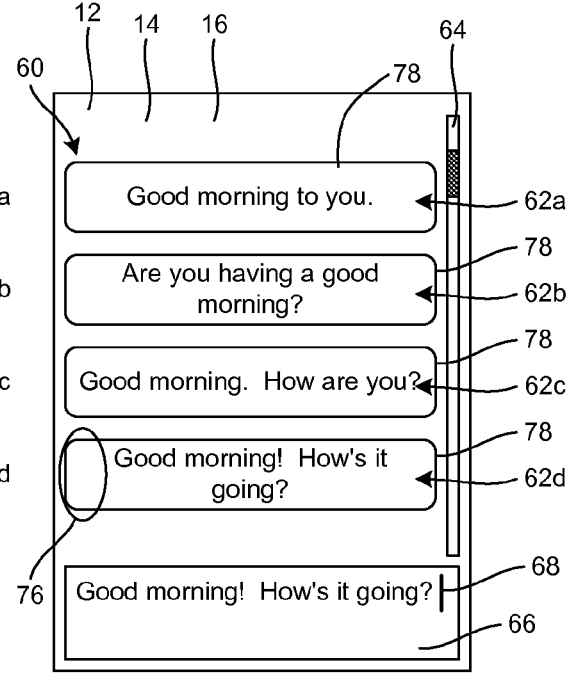

In one embodiment, if the user selects a portion of a phrase 62 for insertion into the input field 66, additional phrases that begin with or contain the selected text may displayed. In the illustrated example of FIG. 4, the user selects the words "good morning." As shown in FIG. 5, additional phrases 62 that begin with or contain the words "good morning" are displayed. In the above-identified manners, message composition may be facilitated by provided a predictive text function for composing a message.

Another exemplary text selection technique is illustrated in FIG. 5. In this technique, an entire phrase 62 is selected by touching a designated area associated with the phrase 62. In one embodiment, the designated area is the empty space immediately preceding the desired phrase 62. For example, as illustrated in FIG. 5, each phrase 62 may be contained in an outline, or balloon 78. The user may select the entire phrase

62 by touching the touch screen 12 between the edge of the balloon 78 and the first character of the desired phrase 62. The result of touching in the designated area for selection of the entire phrase 62 is to automatically enter the corresponding words into the input field 66, as illustrated.

Additional text selection techniques will be described below in connection with selecting text from a message log, also referred to as a conversation log. Any of those techniques may be applied to selecting text from the display of suggested phrases 62. Also, any of the techniques for selecting text from a suggested phrase 62 may be used for selecting text from a message log.

Following block 72 or following a negative determination in block 70 the user may start a message string in block 80. A message string may be started by composing and sending a message to other person. Composing the message may include selecting text from one or more suggested phrases. Other manners of composing a message include typing out the message using the keypad 20 (if present), sequentially touching displayed characters, drawing or handwriting characters on the touch screen 12, etc. Also, composing a message may include a combination of selecting text for automatic insertion into the input field 66 and another technique.

In other situations, starting a message string may occur when the electronic device 10 receives a message from another electronic device. Alternatively, a message string already may be in progress or the user may open a stored message log.

With additional reference to FIGS. 6 through 10, a message log 82 may be displayed. The message log 82 may include the text of messages 84 that have been previously sent from the electronic device 10 and/or received by the electronic device 10. In the illustrated example, four messages 84*a* through 84*d* are shown, but it will be appreciated that less than or more than four messages 84 may be shown. Each message 84 may be displayed in a corresponding balloon 86. Additional messages 84 may be present in the log 82 and accessible using a scroll bar 64 or other navigation tool. Also shown is the input field 66 and cursor 68.

Following block 80, or following some other action that starts a message string, the logical flow may proceed to block 88. For example, block 88 may be reached upon a negative determination in block 56 or as a starting point to the logical flow when the electronic device 10 receives a message.

In block 88, a determination may be made as to whether the user selects text from the displayed message log 82 for automatic addition to the input field 66. Text selection may be made in any of the manners described above for selecting text from a suggested phrase 62. Additional text selection techniques are described in the following paragraphs, which also may be used for selecting text from a suggested phrase 62. If a positive determination is made in block 88, the logical flow may proceed to block 86 where the selected text is automatically added to the input field 66. As indicated, the automatic addition of text into the input field 66 involves adding the selected text without any additional user action (e.g., entering of commands) other than to select the text. Therefore, once selected, the text appears in the input field 66 at the current position of the cursor 68 without any intervening user actions, such as manual copying and pasting of the text.

Figure 6:
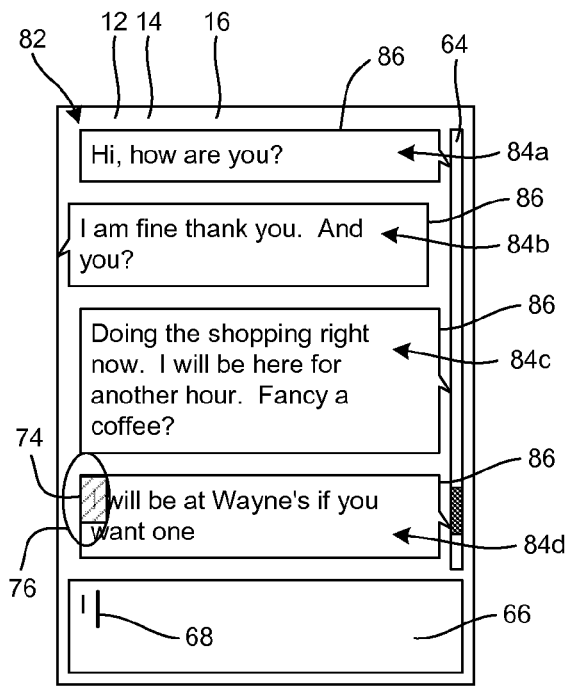
Figure 7:
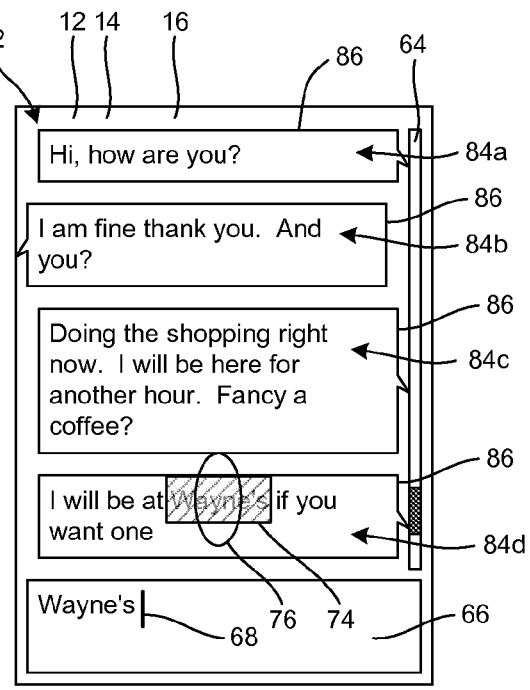

One exemplary text selection technique is illustrated in FIGS. 6 and 7. In this technique, a single word is selected by the user touching the touch screen 12 over the desired word. In the illustrated example of FIG. 6, the desired word is the single character word "I" from message 84*d*, which has been highlighted using cross-hatching to indicate desired text 74. It will be understood that a desired word may have more than one character and the user may touch any part of the word to select the word. For instance, in the illustrated example of FIG. 7, the desired word is "Wayne's" from message 84*d*. The result of touching the word is to automatically enter the corresponding word into the input field 66, as illustrated.

Figure 8:
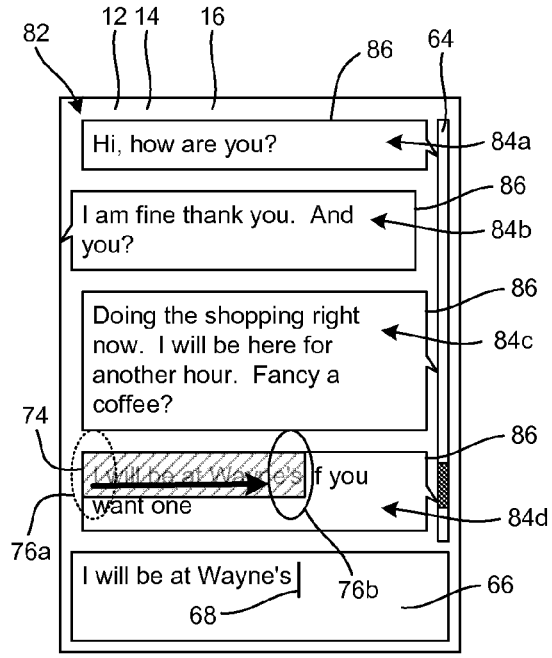

Another exemplary text selection technique is illustrated in FIG. 8. In this technique, the user may touch a starting point (denoted by oval 76*a*) on the touch screen 12, which will result in the selection of any corresponding text into the input field 66. In the illustrated example, the starting point corresponds to the word "I" from message 84*d*. Without interruption to the touching (e.g., without lifting of the user's finger from the touch screen 12), the user may move to an ending point (denoted by oval 76*b*) to select desired text 74 that spans from the starting point to the ending point. In the illustrated example, the ending point corresponds to the word "Wayne's." This type of text selection may be accomplished by touching the touch screen 12 with a finger tip at the starting point, dragging the finger tip to the ending point, and lifting the finger tip from the touch screen 12. As the finger tip is dragged, each successive word that the user moves his or her finger over will be selected and added to the input field 66. In the illustrated example, the user progressive touches "I," "will," "be," "at," and "Wayne's" so that the phrase "I will be at Wayne's" is entered into the input field. The touching of words in this manner need not be in the same order as they appear on the touch screen 12, need not be from the same message 84, and/or need not be sequential words from one or the messages 84. For example, the user may enter "I want a coffee" by touching "I" from message 84*d*, dragging downward to "want" from the same message and moving around message 84*d* to "a" from message 84*c* and then to "coffee" from message 84*c*. Alternatively, phrases composed of multiple words that appear on the touch screen 12 may be composed by successively touching (e.g., tapping) each word individually. The result of touching each of one or more words in this manner is to automatically enter the corresponding words into the input field 66, as illustrated.

Figure 10:
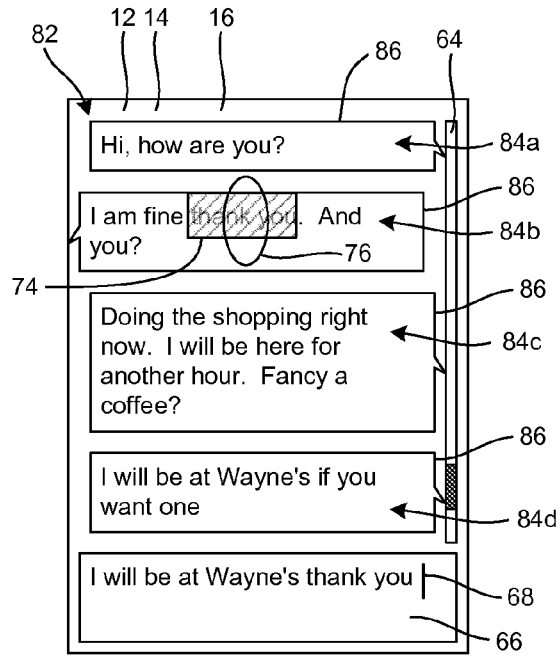

Yet another exemplary text selection technique to select a series of words is illustrated in FIG. 10. In this technique, the user simultaneously touches the touch screen 12 in two locations to identify a starting point (denoted by oval 76*a*) and an ending point (denoted by oval 76*b*). Touching in this manner may be accomplished, for example, by using one's index finger and thumb, or by using one's index finger and middle finger. In response to this touch input, the word associated with the starting point, the word associated with the ending point, and any word(s) between the starting and ending points are added to the input field in the order that the words appear on the touch screen 12. In the illustrated example, the starting point corresponds to the word "I" from message 84*d* and the ending point corresponds to the word "Wayne's" from the same message. Words "will be at" intervene between the starting and ending point. Therefore, in this example, the phrase "I will be at Wayne's" will be entered into the input field 66 as a result of multi-point touching of the touch screen 12. The result of touching the touch screen 12 in two locations is that one or more corresponding words are automatically entered into the input field 66, as illustrated.

Another exemplary text selection technique is illustrated in FIG. 10, which is similar to the text selection technique described in connection with FIG. 4. In the technique of FIG. 10, two words are selected by the user touching the touch screen 12 in the space between the desired words. In the illustrated example, the desired words are "thank you" from message 84*b*, which have been highlighted using cross-hatching to indicate desired text 74. The result of touching in the space between the desired words is to automatically enter the corresponding words into the input field 66, as illustrated.

Still another exemplary text selection technique is similar to the text selection of FIG. 5. In this technique, the text from an entire message 84 may be selected by touching a designated area associated with the message 84. In one embodiment, the designated area is the empty space immediately preceding the desired message 84, such as by touching the touch screen 12 between the edge of the balloon 86 and the first character of the desired message 84. Another designated area may be the edge of the balloon 86. The result of touching in the designated area for selection of the entire message 84 is to automatically enter the corresponding words into the input field 66.

Text selection also may include additional actions, such as double taps and triple taps of the touch screen. For instance, a double tap may select a corresponding sentence from one of the messages 84 and a triple tap may select the entire text of a corresponding message 84.

Figure 9:
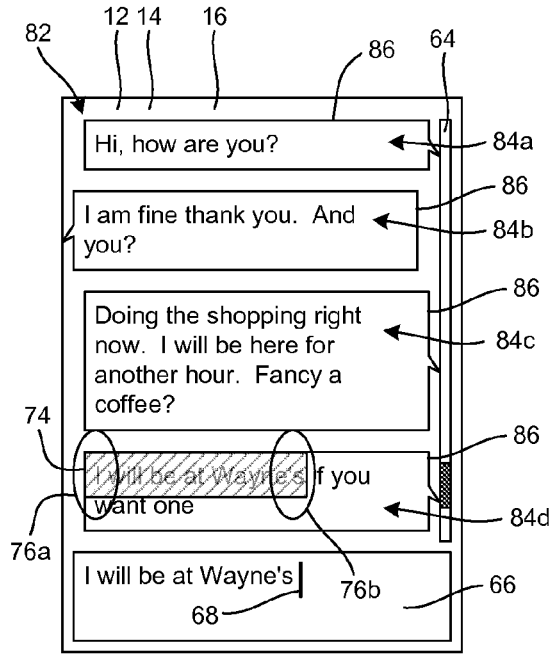

Once some text has been entered into the input field 66 by either touch selecting displayed text or by other entry means (e.g., typing, handwriting on the touch screen 12, etc.), additional text may added to the input field 66 by touch selecting text that is displayed on the touch screen 12 or by other means (e.g., typing or handwriting). For example, the result of the illustrated examples of FIG. 8 or FIG. 9 is to enter the phrase "I will be at Wayne's" into the input field 66. In one embodiment, following such text entry the cursor 68 may be positioned after the entered phrase for the entry of additional text. Continuing the example, FIG. 10 illustrates the selection of the words "thank you" after the phrase "I will be at Wayne's" has been entered in the input field 66, so that the new entered text reads "I will be at Wayne's thank you."

Also, other text editing functions may be carried out. For instance, some of all of the text in the input field 66 may be deleted, text may be rearranged, the cursor 68 may be moved for the entry of text at any position relative to existing text, and so forth. Also, based on entered text, a predictive text function may display additional words or phrases that may logically follow the entered text. The user may touch select displayed predictive text for entry into the input field 66, as described in foregoing portions of this document in greater detail.

Returning to the flow diagram of FIG. 3, the logical flow may proceed to block 92 after block 90. In block 92, text that is selected for entry into input field 66 by touching may be added to a predictive text lexicon associated with the user.

Also, once the user is satisfied with text that appears in the input field 66, the user may command the transmission of a message containing the entered text.

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
   a touch screen that displays a message log containing text of one or more messages that have been transmitted by the electronic device or received by the electronic device, and that displays an input field to show text for a new message undergoing composition, the input field and the message log displayed simultaneously as part of a messaging function of the electronic device; and
   a control circuit configured to:
      receive touch input signals from the touch screen that are indicative of user touch selection of text from the message log; and
      without additional user input, enter the touch selected text into the input field.

2. The electronic device of claim 1, wherein the touch input signal corresponds to user touching an individual word and the individual word is entered into the input field.

3. The electronic device of claim 1, wherein the touch input signal corresponds to a designated spot associated with a message from the message log and all text from the corresponding message is entered into the input field.

4. The electronic device of claim 1, wherein the touch input signal corresponds to user touching of a space between two words and the two words are entered into the input field.

5. The electronic device of claim 1, wherein the touch input signal corresponds to user touching of a first word and movement to touch a second word without interruption of the touching and the first and second words are entered into the input field in the order of touching.

6. The electronic device of claim 1, wherein the touch input signal corresponds to simultaneous touching of a first location and a second location to indicate a text selection starting location and a text selection ending location and text spanning from the starting location to the ending location is entered into the input field.

7. The electronic device of claim 1, wherein the control circuit is further configured to:
   receive user input in the form of at least one of a key depression, handwriting on the touch screen or touching of a character from a displayed keyboard; and
   enter text corresponding to the user input into the input field with the touch selected text.

8. The electronic device of claim 1, wherein the control circuit is further configured to add touch selected text to a predictive text lexicon associated with the user.

9. The electronic device of claim 1, wherein the control circuit is further configured to:
   display one or more suggested phrases on the touch screen;
   receive touch input signals from the touch screen that are indicative of user touch selection of text from one of the suggested phrases; and
   without additional user input, enter the touch selected text from the suggested phrases into the input field.

10. The electronic device of claim 1, wherein the electronic device is a mobile telephone.

11. A method of entering text in an electronic device, comprising:
    displaying a message log containing text of one or more messages that have been transmitted by the electronic device or received by the electronic device on a touch screen;
    displaying an input field to show text for a new message undergoing composition on the touch screen, the input field and the message log displayed simultaneously as part of a messaging function of the electronic device;
    receiving touch input via the touch screen that is indicative of user touch selection of text from the message log; and
    without additional user input, entering the touch selected text into the input field.

12. The method of claim 11, wherein the touch selection of text corresponds to user touching an individual word and the individual word is entered into the input field.

13. The method of claim 11, wherein the touch selection of text corresponds to a designated spot associated with a message from the message log and all text from the corresponding message is entered into the input field.

14. The method of claim 11, wherein the touch selection of text corresponds to user touching of a space between two words and the two words are entered into the input field.

15. The method of claim 11, wherein the touch selection of text corresponds to user touching of a first word and movement to touch a second word without interruption of the touching and the first and second words are entered into the input field in the order of touching.

16. The method of claim 11, wherein the touch selection of text corresponds to simultaneous touching of a first location and a second location to indicate a text selection starting location and a text selection ending location and text spanning from the starting location to the ending location is entered into the input field.

17. The method of claim 11, further comprising:
receiving user input in the form of at least one of a key depression, handwriting on the touch screen or touching of a character from a displayed keyboard; and
entering text corresponding to the user input into the input field with the touch selected text.

18. The method of claim 11, further comprising adding touch selected text to a predictive text lexicon associated with the user.

19. The method of claim 11, further comprising:
displaying one or more suggested phrases on the touch screen;
receiving touch input via the touch screen that is indicative of user touch selection of text from one of the suggested phrases; and
without additional user input, entering the touch selected text from the suggested phrases into the input field.

20. The method of claim 11, wherein the electronic device is a mobile telephone.

* * * * *